(12) United States Patent
Wilson

(10) Patent No.: US 7,521,512 B2
(45) Date of Patent: Apr. 21, 2009

(54) CATALYST COMPOSITION AND POLYMERIZATION PROCESS USING MIXTURE OF SILANE ELECTRON DONORS

(75) Inventor: Stanley E. Wilson, Houston, TX (US)

(73) Assignee: Union Carbide Chemicals & Plastics Technology LLC, Wilmington, DE (US)

(*) Notice: Subject to any disclaimer, the term of this patent is extended or adjusted under 35 U.S.C. 154(b) by 0 days.

(21) Appl. No.: 10/555,548

(22) PCT Filed: May 27, 2004

(86) PCT No.: PCT/US2004/016722

§ 371 (c)(1),
(2), (4) Date: Nov. 4, 2005

(87) PCT Pub. No.: WO2005/005489

PCT Pub. Date: Jan. 20, 2005

(65) Prior Publication Data

US 2006/0264584 A1 Nov. 23, 2006

Related U.S. Application Data

(60) Provisional application No. 60/482,228, filed on Jun. 24, 2003.

(51) Int. Cl.
*C08F 4/616* (2006.01)

(52) U.S. Cl. ............... 526/128; 526/351; 526/124.2; 526/124.3; 526/124.9; 502/103; 502/114; 502/115

(58) Field of Classification Search ............... 526/351, 526/124.2, 124.3, 124.9, 125.3, 128; 502/103, 502/114, 115
See application file for complete search history.

(56) References Cited

U.S. PATENT DOCUMENTS

| | | | |
|---|---|---|---|
| 4,107,413 A | 8/1978 | Giannini et al. | |
| 4,115,319 A | 9/1978 | Scata et al. | |
| 4,220,554 A | 9/1980 | Scata et al. | |
| 4,294,721 A | 10/1981 | Cecchin et al. | |
| 4,330,649 A | 5/1982 | Kioka et al. | |
| 4,439,540 A | 3/1984 | Cecchin et al. | |
| 4,442,276 A | 4/1984 | Kashiwa et al. | |
| 4,460,701 A | 7/1984 | Terano et al. | |
| 4,472,521 A | 9/1984 | Band | |
| 4,540,679 A | 9/1985 | Arzoumanidis et al. | |
| 4,547,476 A | 10/1985 | Terano et al. | |
| 4,548,915 A | 10/1985 | Goodall et al. | |
| 4,562,173 A | 12/1985 | Terano et al. | |
| 4,728,705 A | 3/1988 | Nestlerode et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,100,981 A * | 3/1992 | Schreck et al. | 526/125.6 |
| 5,106,806 A | 4/1992 | Job | |
| 5,146,028 A | 9/1992 | Job | |
| 5,151,399 A | 9/1992 | Job | |
| 5,153,158 A | 10/1992 | Kioka et al. | |
| 5,192,732 A | 3/1993 | Duranel et al. | |
| 5,229,342 A | 7/1993 | Job | |
| 5,247,031 A | 9/1993 | Kioka et al. | |
| 5,247,032 A | 9/1993 | Kioka et al. | |
| 5,414,063 A | 5/1995 | Seeger et al. | |
| 5,652,303 A * | 7/1997 | Ishimaru et al. | 526/125.3 |
| 5,844,046 A | 12/1998 | Ohgizawa et al. | |
| 5,849,654 A * | 12/1998 | Fushimi et al. | 502/125 |
| 5,869,418 A | 2/1999 | Iiskola et al. | |
| 6,001,765 A | 12/1999 | Costa et al. | |
| 6,066,702 A * | 5/2000 | Ro et al. | 526/125.3 |
| 6,087,459 A * | 7/2000 | Miro et al. | 526/128 |
| 6,096,844 A | 8/2000 | Fushimi et al. | |
| 6,111,039 A * | 8/2000 | Miro et al. | 526/128 |
| 6,127,303 A * | 10/2000 | Ebara et al. | 502/125 |
| 6,133,385 A * | 10/2000 | Shamshoum et al. | 526/128 |
| 6,147,024 A * | 11/2000 | Shamshoum et al. | 502/103 |
| 6,184,328 B1 | 2/2001 | Yanagihara et al. | |
| 6,303,698 B1 | 10/2001 | Ushioda et al. | |
| 6,337,377 B1 | 1/2002 | Ebara et al. | |

FOREIGN PATENT DOCUMENTS

| | | |
|---|---|---|
| JP | 04117411 | 9/1990 |
| JP | 05310825 | 2/1991 |
| JP | 06041218 | 2/1991 |

(Continued)

*Primary Examiner*—Ling-Siu Choi
(74) *Attorney, Agent, or Firm*—Whyte Hirschboeck Dudek SC

(57) ABSTRACT

A catalyst composition for the polymerization of olefins comprising the combination of one or more Ziegler-Natta procatalysts comprising one or more transition metal compounds; one or more aluminum containing cocatalysts; and a mixture comprising two or more selectivity control agents (SCA's), corresponding to the formula: $(CH_3O)_nSi(OR)_{4-n}$, wherein R, independently each occurrence, is $C_{2-12}$ alkyl, $C_{3-12}$ cycloalkyl, $C_{6-18}$ aryl or (poly)alkyl-substituted aryl, or $C_{7-18}$ poly(aryl)-substituted alkyl, and n is an integer from zero to 4.

14 Claims, No Drawings

FOREIGN PATENT DOCUMENTS

| | | |
|---|---|---|
| JP | 04370105 | 6/1991 |
| JP | 06073116 | 6/1991 |
| JP | 06136018 | 6/1991 |
| JP | 05295035 | 7/1991 |
| JP | 06073113 | 7/1991 |
| JP | 06073114 | 7/1991 |
| JP | 06136022 | 7/1991 |
| JP | 04370103 | 12/1992 |
| JP | 06136026 | 9/1994 |
| WO | WO99/58585 | 8/1995 |
| WO | WO99/20663 | 4/1999 |
| WO | WO95/21203 | 11/1999 |

* cited by examiner

US 7,521,512 B2

CATALYST COMPOSITION AND POLYMERIZATION PROCESS USING MIXTURE OF SILANE ELECTRON DONORS

CROSS-REFERENCE STATEMENT

This application claims the benefit of U.S. Provisional Application No. 60/482,228, filed Jun. 24, 2003.

BACKGROUND OF THE INVENTION

The present invention relates to Ziegler-Natta catalyst compositions for use in the polymerization of olefins having improved control over polymer properties through the use of carefully chosen mixtures of selectivity control agents. Ziegler-Natta catalyst compositions are well known in the art. Typically, these compositions include a transition metal polymerization catalyst, especially a titanium containing compound; a co-catalyst, usually an organoaluminum compound; and a selectivity control agent (SCA), usually an organosilicon compound or mixture thereof. Examples of such Ziegler-Natta catalyst compositions are shown in U.S. Pat. No. 5,247,032; U.S. Pat. No. 5,247,031; U.S. Pat. No. 5,229,342; U.S. Pat. No. 5,153,158; U.S. Pat. No. 5,151,399; U.S. Pat. No. 5,146,028; U.S. Pat. No. 5,106,806; U.S. Pat. No. 5,082,907; U.S. Pat. No. 5,077,357; U.S. Pat. No. 5,066,738; U.S. Pat. No. 5,066,737; U.S. Pat. No. 5,034,361; U.S. Pat. No. 5,028,671; U.S. Pat. No. 4,990,479; U.S. Pat. No. 4,927,797; U.S. Pat. No. 4,829,037; U.S. Pat. No. 4,816,433; U.S. Pat. No. 4,728,705; U.S. Pat. No. 4,562,173; U.S. Pat. No. 4,548,915; U.S. Pat. No. 4,547,476; U.S. Pat. No. 4,540,679; U.S. Pat. No. 4,472,521; U.S. Pat. No. 4,460,701; U.S. Pat. No. 4,442,276; U.S. Pat. No. 4,439,540; U.S. Pat. No. 4,330,649; U.S. Pat. No. 4,294,721; U.S. Pat. No. 4,220,554; U.S. Pat. No. 4,115,319; and U.S. Pat. No. 4,107,413.

Catalyst compositions designed primarily for the polymerization of propylene or mixtures of propylene and ethylene generally include a selectivity control agent in order to affect polymer properties, especially tacticity or stereoregularity of the polymer backbone. As one indication of the level of tacticity, especially the isotacticity of polypropylene, the quantity of such polymer that is soluble in xylene or similar liquid that is a non-solvent for the tactic polymer is often used. This is referred to as the xylene solubles content of the polymer, or XS. In addition to tacticity control, molecular weight distribution (MWD), melt flow (MF), oligomer content, and other properties of the resulting polymer are often affected, sometimes adversely, by use of SCA's. For example, many SCA's that give desirable control over XS, give polymers of such high molecular weight so as to detrimentally affect the MF of the polymer. Increasing amounts of a chain transfer agent, such as hydrogen, may be employed in order to provide desirable MF properties in the resulting polymer. Alternatively, a post reactor treatment such as use of peroxides, may be used to reduce polymer chain length. These techniques however, result in increased cost, elevated oligomer content, and can introduce undesired volatile components into the product. Accordingly, SCA's having less adverse affect on MF properties or reduced hydrogen sensitivity, while retaining good XS properties are still desired.

Known SCA's include individual tetraalkoxysilanes, such as tetramethoxysilane (TMOS) or tetraethoxysilane (TEOS). Although these SCA's are capable of producing high melt flow polymers at reduced hydrogen levels, the activity of most Ziegler-Natta procatalysts is generally adversely affected by their use. In addition, isotacticity control, also referred to as catalyst selectivity, using TEOS as the sole SCA is generally poor, leading to polypropylene products having high xylene solubles content, that is XS values greater than 3.0 percent or even greater than 5.0 percent.

Use of mixtures of SCA's in order to adjust polymer properties is also known. Examples of prior art disclosures of catalyst compositions making use of mixed SCA's include: U.S. Pat. No. 6,337,377; U.S. Pat. No. 6,303,698; U.S. Pat. No. 6,184,328; U.S. Pat. No. 6,147,024; U.S. Pat. No. 6,133,385; U.S. Pat. No. 6,127,303; U.S. Pat. No. 6,111,039; U.S. Pat. No. 6,096,844; U.S. Pat. No. 6,087,459; U.S. Pat. No. 6,066,702; U.S. Pat. No. 6,001,765; U.S. Pat. No. 5,869,418; U.S. Pat. No. 5,849,654; U.S. Pat. No. 5,844,046; U.S. Pat. No. 5,652,303; U.S. Pat. No. 5,414,063; U.S. Pat. No. 5,192,732; U.S. Pat. No. 5,100,981; WO 99/58585; WO 99/20663; and WO95/21203.

The foregoing mixtures of SCA's generally include various combinations of alkyl- or cycloalkyl-substituted siloxanes, such as dicyclopentyldimethoxysilane (DCPDMS), propyltriethoxysilane (PTES), methylcyclohexyldimethoxysilane (MCHDMS); and mixtures of the foregoing mixed silane compounds, or mixtures thereof with individual tetraalkoxysilane compounds. Generally these combinations give polypropylene polymers having better XS values, but require the use of large hydrogen concentrations or peroxide post treatment to obtain desired melt flow values.

Despite the advances occasioned by the use of the foregoing SCA mixtures, there remains a need in the art to provide a Ziegler-Natta catalyst composition for the polymerization of olefins comprising the combination of a Ziegler-Natta catalyst with a mixture of selectivity control agents that results in good selectivity control, evidenced by production of polymers having reduced or acceptable xylene soluble content (XS), especially XS$\leq$3.0 weight percent, in combination with good hydrogen sensitivity and good catalyst activity. Especially desired is the ability to produce moderate or high melt flow polymers at relatively low $H_2$ concentrations with good catalyst efficiency.

SUMMARY OF THE INVENTION

The present invention provides a catalyst composition for the polymerization of olefins comprising the combination of one or more Ziegler-Natta procatalysts comprising one or more transition metal compounds; one or more aluminum containing cocatalysts; and a mixture comprising two or more selectivity control agents (SCA's), each SCA corresponding to the formula: $(CH_3O)_n Si(OR)_{4-n}$, wherein R, independently each occurrence, is $C_{2-12}$ alkyl, $C_{3-12}$ cycloalkyl, $C_{6-18}$ aryl or (poly)alkyl-substituted aryl, or $C_{7-18}$ poly(aryl)-substituted alkyl, and n is an integer from zero to 4.

The present invention also provides a method of polymerizing one or more olefins and, optionally, one or more polymerizable comonomers, especially propylene, a mixture of ethylene and propylene, or a mixture of propylene, ethylene and a conjugated or non-conjugated diene, under polymerization conditions using the previously described Ziegler-Natta catalyst composition comprising said mixture of SCA's. The polymerization may be conducted in a single reactor or in two or more reactors connected in parallel or in series. When operating in multiple reactors, one or more than one selectivity control agent may be employed in each reactor, with the proviso that in at least one reactor the foregoing mixture of SCA's is present.

Although a broad range of compounds are known generally as selectivity control agents, a particular catalyst composition may have a specific procatalyst compound or group of compounds with which it is especially compatible. The present invention additionally provides a catalyst composition for the polymerization of olefins, especially propylene, which includes the combination of a particular type of procatalyst with the foregoing mixture of selectivity control agents which especially results in the ability to control polymer properties, especially molecular weight as measured by MF, and stereoselectivity, as measured by xylene extractables (XS).

DETAILED DESCRIPTION

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication identified herein are hereby incorporated by reference in their entirety, especially with respect to the disclosure of structures, synthetic techniques, and general knowledge in the art.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if-used, excludes any component, step or procedure not specifically delineated or listed. The term "or", unless stated otherwise, refers to the listed members individually as well as in any combination.

Unless stated to the contrary or conventional in the art, all parts and percents used herein are based on weight. The term "(poly)alkyl-substituted" means optionally more than one alkyl substituent. The term "mixture" when used with respect to SCA's, means the use of two or more SCA components, simultaneously during at least a portion of a polymerization. The individual SCA's may be added separately to a reactor or premixed and added to the reactor in the form of the desired mixture. In addition, other components of the polymerization mixture, including the procatalyst, may be combined with one or more of the SCA's of the mixture, and optionally prepolymerized, prior to addition to the reactor. Generally, the SCA's are supplied to the reactor in the form of dilute hydrocarbon solutions.

When quantities of a tetra-substituted silane (either the tetramethoxysilane or the tetra-substituted exchange product) are present in the mixture, catalyst activity and/or selectivity may be adversely affected. Accordingly, preferred mixtures of alkoxysilanes for use herein comprise two or more selectivity control agents, each SCA corresponding to the formula: $(CH_3O)_nSi(OR)_{4-n}$, wherein R is $C_{2-6}$ alkyl or $C_{5-6}$ cycloalkyl, and n is an integer from 1 to 4, preferably from 1 to 3.

More preferably the SCA is a mixture of homologs resulting from exchange of tetramethylorthosilicate (tetramethoxysilane) with a $C_{2-6}$ alkanol or cycloalkanol, phenol or a (poly)alkyl-substituted phenol, or a distillation fraction thereof. Highly preferably the distillation fraction is the fraction obtained upon distillation of such a mixture at a fractionation temperature sufficiently high to reduce the quantity of monomethoxysilane to less than 10 weight percent, more preferably less than 1 weight percent. Most desirably, the SCA mixture comprises at least three tetraalkoxysilane homologs and no single homolog is present in an amount greater than 75 percent, more preferably no single homolog is present in an amount greater than 70 percent, and most preferably no single homolog is present in an amount greater than 65 percent of the total SCA mixture.

A particularly preferred SCA mixture comprises:

a) tetramethoxysilane in an amount from 0-15, preferably 0-12, more preferably 0-10 percent;

b) trimethoxy($C_{2-6}$alkoxy)silane in an amount from 10-40, preferably 15-35, more preferably 15-30 percent;

c) dimethoxydi($C_{2-6}$alkoxy)silane in an amount from 15-60, preferably 20-50, more preferably 25-45 percent;

d) methoxytri($C_{2-6}$alkoxy)silane in an amount from 10-40, preferably 15-35, more preferably 15-30 percent; and e) tetra($C_{2-6}$alkoxy)silane in an amount from 0-15, preferably 0-12, more preferably 0-10 percent, the total of components a), b), c), d) and e) equaling 100 percent.

According to the invention, by adjusting the ratios of the various homologs in the present SCA mixture within the foregoing limits of homolog content, polymers having good XS and MF are obtainable. In particular, extremely high melt flow polypropylene products may be obtained at lower hydrogen chain transfer agent concentrations during the polymerization. Additionally, the polymer product contains extremely low oligomers content. For example, compared to the use of a typical alkyltrimethoxysilane SCA, such as n-propyltrimethoxysilane, or to a dialkyldimethoxysilane SCA, such as dicyclopentyldimethoxysilane, reductions of oligomer content of from 75 to 90 percent may be achieved using the present SCA mixture under equivalent reaction conditions.

Ziegler-Natta polymerization catalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, especially a magnesium halide. Preferred polymerization catalysts comprise a mixture of titanium halides, titanium alkoxides, titanium aryloxides, or mixtures thereof supported on magnesium halide compounds, especially magnesium dichloride.

Any of the conventional Ziegler-Natta, transition metal compound containing catalysts can be used in the present invention. The catalyst component of a conventional Ziegler-Natta catalyst preferably contains a transition metal compound of the general formula $TrX_x$ where Tr is the transition metal, X is a halogen or a $C_{1-10}$ hydrocarboxyl or hydrocarbyl group, and x is the number of such X groups in the compound in combination with a magnesium halide. Preferably, Tr is a Group 4, 5 or 6 metal, more preferably a Group 4 metal, and most preferably titanium. Preferably, X is chloride, bromide, $C_{1-4}$ alkoxide or phenoxide, or a mixture thereof, more preferably chloride.

Illustrative examples of suitable transition metal compounds that may be used to form a Ziegler-Natta transition metal catalyst are $TiCl_4$, $ZrCl_4$, $TiBr_4$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, $Ti(OC_2H_5)Cl_3$, and mixtures thereof. No restriction on the number of transition metal compounds is made as long as at least one transition metal compound, especially a titanium compound is present.

Examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium.

Suitable Ziegler-Natta, transition metal catalysts that may be used in the present invention are disclosed in U.S. Pat. No. 5,077,357, U.S. Pat. No. 4,927,797; U.S. Pat. No. 4,816,433 and U.S. Pat. No. 4,839,321. In these references, Ziegler-Natta transition metal procatalyst compounds comprising a solid component obtained by halogenating one or more times a mixture of dialkoxymagnesium and tetraalkoxytitanium compounds obtained by a solid/solid metathesis in the presence of an internal electron donor are disclosed.

Internal electron donors are generally added to the procatalyst precursor prior to halogenation to provide tacticity control and catalyst crystallite sizing. Examples of suitable internal electron donors include: amines, amides, ethers, esters, aromatic esters, ketones, nitriles, phosphines, stibines, arsines, phosphoramides, thioethers, thioesters, aldehydes, alcoholates, and salts of organic acids. Preferred internal electron donor compounds are aromatic diethers, alkylether derivatives of aromatic esters, and aromatic dicarboxylic acid diesters, especially aromatic di($C_{1-6}$)alkyl ethers, phthalate diesters, or alkyl ether derivatives of alkylbenzoates.

The Ziegler-Natta, transition metal procatalyst or resulting catalyst formulation may also include an inert support material, if desired. The inert support should be a finely particulated or comminuted solid which does not adversely alter the catalytic performance of resulting procatalyst. Examples include metal oxides, such as alumina, and metalloid oxides, such as silica.

Highly desirably, the olefin polymerization procatalyst precursors employed in the invention comprise magnesium moieties. Sources for such magnesium moieties include anhydrous magnesium chloride, magnesium dialkoxides or aryloxides, or carboxylated magnesium dialkoxides or aryloxides. Preferred sources of magnesium moieties are magnesium di($C_{1-4}$)alkoxides, especially diethoxymagnesium. Additionally the precursors desirably comprise titanium moieties. Suitable sources of titanium moieties include titanium alkoxides, titanium aryloxides, and/or titanium halides. Preferred precursors comprise one or more magnesium di($C_{1-4}$) alkoxides and one or more titanium tetra($C_{1-4}$)alkoxides.

Various methods of making procatalyst precursor compounds are known in the art. These methods are described in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In a preferred method, the preparation involves chlorination of the foregoing mixed magnesium and titanium alkoxides, and may involve the use of one or more compounds, referred to as "clipping agents", that aid in forming or solubilizing specific compositions via a solid/solid methasis. Examples of suitable clipping agents include trialkylborates, especially triethylborate, phenolic compounds, especially cresol, and silanes.

A preferred procatalyst precursor for use herein is a mixed magnesium/titanium compound of the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, preferably 2-4, most preferably 3; e is 2-12, preferably 6-10, most preferably 8; and f is 1-10, preferably 1-3, most preferably 2. The precursors are ideally prepared by controlled precipitation through removal of an alcohol from the reaction mixture used in their preparation. An especially desirable reaction medium comprises a mixture of an aromatic liquid, especially a chlorinated aromatic compound, most especially chlorobenzene, with an alkanol, especially ethanol, and an inorganic chlorinating agent. Suitable inorganic chlorinating agents include chlorine derivatives of silicon, aluminum and titanium, especially titanium tetrachloride or titanium trichloride, most especially titanium tetrachloride. Removal of the alkanol from the solution used in the chlorination, results in precipitation of the solid precursor, having especially desirable morphology and surface area. Moreover, the resulting precursors are particularly uniform particle sized and resistant to particle crumbling as well as degradation of the resulting procatalyst.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid precursor is suitable for use in the present invention.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, and alkylbenzenes. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene is particularly preferred.

Suitable electron donors are those electron donors free from active hydrogens that are conventionally employed in the formation of titanium-based procatalysts. Examples include (poly)ethers, (poly)esters, amines, imines, nitriles, phosphines, stibines, and arsines, particularly (poly)$C_{1-6}$ alkyl ethers of aromatic (poly)hydroxyl compounds, $C_{1-6}$ alkyl esters of aromatic monocarboxylic or dicarboxylic acids, and $C_{1-6}$ alkyl ether derivatives of such monocarboxylic or dicarboxylic acids.

The benefits of the invention are particularly noticeable when the procatalyst employed comprises as an internal electron donor a di($C_{1-6}$)alkyl ether of an aromatic dihydroxyl compound, more especially a di($C_{1-6}$)alkyl ether of 1,2-dihydroxybenzene, and most especially 1-ethoxy-2-(n-pentoxy) benzene. Procatalysts containing these preferred internal donors show improved catalyst activity when combined with the SCA's of the present invention.

Another preferred procatalyst compound for use in the present invention is the product resulting from halogenation of a metal complex of the approximate general formula:

Mg$_3$Ti(OC$_2$H$_5$)$_8$Cl$_2$, and comprising diisobutylphthalate, ethylbenzoate, or 1-ethoxy-2-n-pentoxybenzene internal electron donor.

Co-catalysts for use with the foregoing Ziegler-Natta catalysts according to the invention include organoaluminum compounds, such as alkylaluninumdihalides, trialkoxyaluminums, dialkylaluminum halides, and trialkylaluminum compounds containing from 1-10 carbon atoms in each alkyl group. Preferred cocatalytsts are C$_{1-4}$ trialkylaluminum compounds, especially triethylaluminum (TEA).

The present SCA mixture may be employed in combination with other SCA compounds or mixtures (referred to as secondary SCA's) in order to produce polymers having properties such as broader molecular weight distribution, improved catalyst efficiency and/or selectivity. For example, employing the present mixed SCA's in combination with a small quantity of an alkylalkoxysilane or cycloalkylalkoxysilane, especially from 0.1 to 2.0 percent, more especially from 0.5 to 1.5 percent of said secondary SCA or mixture of SCA's, can result in production of polymers having high isotacticity (low XS), low oligomer content, at high efficiency, while retaining reasonable hydrogen response. The secondary SCA may be employed in combination with the present SCA mixture in the same reactor, or separately in one or more reactors operating in series with one or more reactors containing the present SCA mixture. The multiple reactors may also operate in slurry, solution or gas phase or a combination thereof, especially a first reactor operating under slurry polymerization conditions followed by a second reactor operating under gas phase polymerization conditions.

Suitable secondary SCA's for use in combination with the present SCA mixture herein include silane compounds, especially alkylalkoxysilanes or cycloalkylalkoxysilanes; ethers and polyethers, especially alkyl-, cyloalkyl-, aryl-, mixed alkyl/aryl-, mixed alkyl/cycloalkyl-, and/or mixed cycloalkyl/aryl-ethers and/or polyethers; esters and polyesters, especially alkyl-, cycloalkyl- and/or aryl-esters of monocarboxylic or dicarboxylic acids, preferably aromatic monocarboxylic- or dicarboxylic acids; alkyl- or cycloalkyl-ether or thioether derivatives of such esters or polyesters, especially alkyl ether-derivatives of alkyl esters of aromatic monocarboxylic acids or alkyl diesters of aromatic dicarboxylic acids; and Group 15 or 16 heteroatom-substituted derivatives of all of the foregoing; and amine compounds, especially cyclic, aliphatic or aromatic amines, more especially pyrrol or pyridine compounds; all of the foregoing SCA's containing from 2 to 60 carbons total and from 1 to 20 carbons in any alkyl or alkylene group, 3 to 20 carbons in any cycloalkyl or cycloalkylene group, and 6 to 20 carbons in any aryl or arylene group.

Preferred secondary SCA's for use in combination with the SCA mixture herein are alkoxy silanes having the general formula: SiR"$_m$(OR')$_{4-m}$ (II) where R" independently each occurrence is a hydrogen or a hydrocarbyl group of up to 20 carbons, optionally containing one or more Group 15 or 16 heteroatoms, preferably C$_{1-6}$ alkyl or C$_{5-6}$ cycloalkyl; R' is a C$_{1-20}$ alkyl group; and m is 1-3.

Examples of the foregoing secondary selectivity control agents for use herein include: dicyclopentyldimethoxysilane, di-tert-butyldimethoxysilane, methylcyclohexyldimethoxysilane, diphenyldimethoxysilane, diisopropyldimethoxysilane, di-n-propyldimethoxy-silane, di-n-butyldimethoxysilane, cyclopentyltrimethoxysilane, n-propyltrimethoxysilane, n-propytriethoxysilane, ethyltriethoxysilane, cyclopentylpyrrolidinodimethoxysilane, bis(pyrrolidino)dimethoxysilane, bis(perhydroisoquinolino)dimethoxysilane, cyclohexyltriethoxysilane, methyltripropoxysilane, cyclopentyltributoxysilane, 1,2-di-n-propoxybenzene, 1,2-di-n-butoxybenzene, 1-methyl-2,3-dimethoxybenzene, 1-ethoxy-2-n-pentoxybenzene, 2,6-lutidine, tetrahydrofuran, ethyl p-ethoxybenzoate, and diisobutyl phthalate. A preferred secondary SCA, particularly for achieving broader molecular weight distribution polymers, is dicyclopentyldimethoxysilane (DCPDMS).

One suitable method of practicing a polymerization process according to the present invention comprises performing the following steps in any order or in any combination, or subcombination of individual steps:

a) providing a Ziegler-Natta catalyst composition to a polymerization reactor;

b) providing an organoaluminum cocatalyst compound to the polymerization reactor;

c) providing a mixture of SCA's meeting the foregoing requirements to the polymerization reactor;

d) providing one or more polymerizable monomers to the reactor; and e) extracting polymer product from the reactor.

Suitable polymerization processes in which the present invention is particularly suited include gas phase, liquid phase, slurry, and bulk polymerization processes, operating in one or more than one reactor. Suitable gas phase polymerization processes include the use of condensing mode as well as super condensing mode wherein gaseous components including added inert low boiling compounds are injected into the reactor in liquid form for purposes of heat removal. When multiple reactors are employed it is desirable that they operate in series, that is the effluent from the first reactor is charged to the second reactor and additional monomer or different monomer added to continue polymerization. Additional catalyst or catalyst components (that is procatalyst or cocatalyst) may be added, as well as additional quantities of the SCA mixture, a different SCA or mixture, or individual components of the SCA mixture. Highly desirably, the present SCA mixture is added to only the first reactor of the series.

As an example, the process of the invention may be conducted in two reactors in which two olefins, most preferably, propylene and ethylene, are contacted to prepare a copolymer. In one such process, polypropylene is prepared in the first reactor and a copolymer of ethylene and propylene is prepared in the second reactor in the presence of the polypropylene prepared in the first reactor. Regardless of the polymerization technique employed, it is understood that the mixture of SCA's and the catalyst composition to be employed, or at least the procatalyst component thereof may be contacted in the absence of other polymerization components, especially, monomer prior to addition to the reactor.

The catalyst composition of the invention may be used in all commercially practiced polymerization processes. Desirably, the SCA mixture and cocatalyst are precontacted, optionally in the presence of monomer and optional diluent. To this mixture the catalyst precursor is added under conditions to achieve suitable polymer formation. If desired, the process may also include a prepolymerization step, whereby the catalyst precursor is contacted with a small amount of monomer optionally after having been contacted with the co-catalyst and the selectivity control agent mixture. Examples of polymerization processes including a prepolymerization step are described in U.S. Pat. No. 4,767,735, and U.S. Pat. No. 4,927,797.

It is expressly intended that the foregoing disclosure of preferred, more preferred, highly preferred, or most preferred substituents, ranges, end uses, processes, or combinations with respect to any one of the embodiments of the invention is applicable as well to any other of the preceding or succeeding embodiments, independently of the identity of any other specific substituent, range, use, process, or combination.

The invention is further illustrated by the following examples that should not be regarded as limiting of the present invention.

EXAMPLES 1-9

Procatalyst A Formation

A titanium containing Ziegler-Natta catalyst procatalyst composition is prepared by slurrying a mixture of a magnesium diethoxide and titanium ethoxide/chloride containing precursor corresponding to the formula $Mg_3Ti(OC_2H_5)_8Cl_2$ (made substantially according to U.S. Pat. No. 5,077,357) with diisobutylphthalate (0.2 liter/kilogram precursor) in a 50/50 (vol/vol) mixture of $TiCl_4$/monochlorobenzene (MCB, 19 liters/kilogram precursor). After the mixture is heated at 113° C. for 60 minutes, it is filtered. The resulting moist mass is slurried in a 50/50 $TiCl_4$/MCB mixture (19 liters/kilogram precursor) at 113° C. for 30 minutes, filtered, and the process repeated once more (total of three halogenations). The resulting solid is rinsed with isopentane and then dried with flowing warm nitrogen. This procatalyst contains 2.76 percent Ti and is designated as procatalyst A.

Procatalyst B Formation

The foregoing procedure is substantially repeated excepting that the internal electron donor used is 1-ethoxy-2-(n-pentoxy)benzene present in each of the first two halogenations. This procatalyst is designated as procatalyst B.

SCA-1 Formation

A mixture of alkoxysilanes is prepared by reaction of n-pentanol with tetramethyl orthosilicate, $Si(OCH_3)_4$. The reaction is conducted under a nitrogen atmosphere in a 100 ml glass flask equipped with a magnetic stirring bar and a simple distillation apparatus. To the flask is added 15 ml (0.1 moles) of tetramethylorthosilicate, 21.7 ml (0.2 moles) of 1-pentanol, and 2 ml of 25 percent sodium methoxide/methanol solution. The solution is heated and about 10 ml of methanol is removed by distillation. The solution is cooled to room temperature and 4.5 ml of 2M HCl in diethylether is added, forming a precipitate of solid sodium chloride. Ether and residual methanol is removed under vacuum. The remaining mixture is filtered to remove sodium chloride and used directly as SCA mixture identified as n-$C_5H_{11}O$. Analysis (mole percent): tetramethoxysilane 6.6 percent; n-pentoxytrimethoxysilane 23.3 percent; di-n-pentoxydimethoxysilane 37.5 percent; tri-n-pentoxymethoxysilane 27.0 percent; and tetra-n-pentoxysilane 5.6 percent.

SCA-2 Formation

The product mixture from SCA-1 formation was distilled using a simple glass condenser and collection flask. The fraction boiling at 73-78 ° C. (0.05 torr, 7 Pa) was collected. Analysis indicated the product (SCA-2) contained approximately 92 percent dimethoxydipentoxysilane and 8 percent methoxytripentoxysilane.

SCA-3, SCA4, SCA-5, SCA-6 Formation

The reaction conditions of SCA-1 formation are substantially repeated using cyclopentanol (cycl-$C_5H_9O$), isobutanol (i-$C_4H_9O$), n-butanol (n-$C_4H_9O$), and n-hexanol (n-$C_6H_{13}O$) respectively. The products were used without distillation.

Polymerization Results

Propylene is polymerized in a laboratory scale liquid phase autoclave batch reactor operating under slurry polymerization conditions at 67° C. for one hour, using 1350 grams of propylene, sufficient procatalyst to provide 0.01 mmoles Ti, 1.0 mmoles of triethylaluminum cocatalyst, 0.25 mmoles SCA, and varying quantities of hydrogen to adjust melt flow of the resulting polymer.

Where indicated the following physical properties are measured in the following manner:

Melt Flow: measured according to ASTM-1238 (condition 230/2.16)

XS: The amount of polymer extracted from film samples by p-xylene at 25° C. determined by differential refractive index measurements correlated to measurements made by a gravimetric technique (21 Code of Federal Regulations, §177.1520 or equivalent).

Polymer properties using various SCA mixtures according to the invention and two comparative SCA's are provided in Table 1.

TABLE 1

| Ex. | Procatalyst | SCA | $H_2$ (mmoles) | Activity kg/gTi · hr · 690 kPa | MF (g/10 min) | XS (percent) |
|---|---|---|---|---|---|---|
| A* | A | DCPDMS[1] | 140 | 1,152 | 4.7 | 2.0 |
| 1 | " | SCA-1 | 23 | 620 | 6.3 | 3.0 |
| 2 | " | SCA-1 | 116 | 1,090 | 24.4 | 2.5 |
| 3 | " | SCA-2 | 23 | 750 | 8.3 | 4.1 |
| 4 | " | SCA-3 | 6 | 482 | 6.4 | 3.0 |
| 5 | " | SCA-4 | 12 | 604 | 4.7 | 3.3 |
| 6 | " | SCA-5 | 18 | 400 | 7.5 | 2.7 |
| 7 | " | SCA-6 | 18 | 668 | 4.8 | 3.0 |
| B* | A | TMOS[2] | 12 | 173 | 2.3 | 2.5 |
| C* | B | DCPDMS[1] | 140 | 1,800 | 3.6 | 1.5 |
| 8 | " | SCA-1 | 12 | 741 | 4.3 | 2.6 |
| 9 | " | SCA-1 | 23 | 1,060 | 3.2 | 2.8 |

*comparative, not an example of the invention
[1]dicyclopentyldimethoxysilane, not a mixture
[2]tetramethoxysilane, not a mixture As may be seen by reference to Table 1, melt flow values of the resulting polymer equivalent to or greater than that obtainable using the comparative SCA can be obtained according to the invention at significantly reduced hydrogen levels while maintaining acceptable XS values. Alternatively, high catalyst efficiencies can be maintained at equivalent hydrogen levels.

EXAMPLES 10-13

The polymerization conditions of Examples 1-9 were substantially repeated using a mixture of SCA-1 with DCPCMS. Results are contained in Table 2.

TABLE 2

| Ex. | Procatalyst | SCA-1/ DCPDMS | $H_2$ (mmoles) | Activity kg/gTi · hr · 690 kPa | MF (g/10 min) | XS (percent) |
|---|---|---|---|---|---|---|
| 10 | A | 95/5 | 35 | 677 | 9.8 | 2.0 |
| 11 | B | 99/1 | 47 | 1,147 | 3.3 | 2.2 |

TABLE 2-continued

| Ex. | Pro-catalyst | SCA-1/DCPDMS | $H_2$ (mmoles) | Activity kg/gTi·hr·690 kPa | MF (g/10 min) | XS (percent) |
|---|---|---|---|---|---|---|
| 12 | B | 95/5 | 47 | 1,035 | 5.8 | 2.4 |

The above results indicate that good catalyst activity and low XS content polymers are obtainable using a SCA mixture according to the present invention containing only a minor amount of DCPCMS, thereby significantly reducing the cost of the SCA component.

The invention claimed is:

1. A catalyst composition for the polymerization of one or more olefins comprising the combination of one or more Ziegler-Natta procatalysts comprising one or more transition metal compounds; one or more aluminum containing cocatalysts; and a mixture comprising two or more selectivity control agents (SCA's), each SCA corresponding to the formula: $(CH_3O)_n Si(OR)_{4-n}$, wherein R, independently each occurrence, is $C_{2-12}$ alkyl, $C_{3-12}$ cycloalkyl, $C_{6-18}$ aryl or poly(alkyl)-substituted aryl, or $C_{7-18}$ poly(aryl)-substituted alkyl, and n is an integer from 1 to 4.

2. A catalyst composition according to claim 1 wherein n is an integer from 1 to 3.

3. A catalyst composition according to claim 1 wherein each SCA corresponds to the formula: $(CH_3O)_n Si(OR)_{4-n}$, wherein R is $C_{2-6}$ alkyl or $C_{5-6}$ cycloalkyl, and n is an integer from 1 to 4.

4. A catalyst composition according to claim 1 wherein the mixture of SCA's comprises a mixture of homologs resulting from exchange of tetramethylorthosilicate with one or more $C_{2-6}$ alkanols or $C_{3-6}$ cycloalkanols.

5. A catalyst composition according to claim 3 wherein the mixture of SCA's comprises at least three tetraalkoxysilane homologs and no single homolog is present in the SCA mixture in an amount greater than 75 weight percent.

6. A catalyst composition according to claim 5 wherein no single homolog is present in the SCA mixture in an amount greater than 70 weight percent.

7. A catalyst composition according to claim 6 wherein no single homolog is present in the SCA mixture in an amount greater than 65 weight percent.

8. A catalyst composition according to claim 7 wherein the SCA mixture comprises:

a) tetramethoxysilane in an amount from 0-15 percent;
b) trimethoxy($C_{2-6}$alkoxy)silane in an amount from 10-40 percent;
c) dimethoxydi($C_{2-6}$alkoxy)silane in an amount from 15-60 percent;
d) methoxytri($C_{2-6}$alkoxy)silane in an amount from 10-40 percent; and
e) tetra($C_{2-6}$alkoxy)silane in an amount from 0-15 percent, the total of components a), b), c), d) and e) equaling 100 weight percent.

9. A catalyst composition according to claim 8 wherein the SCA mixture comprises:

a) tetramethoxysilane in an amount from 0-12 percent;
b) trimethoxy($C_{2-6}$alkoxy)silane in an amount from 15-35 percent;
c) dimethoxydi($C_{2-6}$alkoxy)silane in an amount from 20-50 percent;
d) methoxytri($C_{2-6}$alkoxy)silane in an amount from 15-35 percent; and
e) tetra($C_{2-6}$alkoxy)silane in an amount from 0-12 percent, the total of components a), b), c), d) and e) equaling 100 weight percent.

10. A catalyst composition according to claim 9 wherein the SCA mixture comprises:

a) tetramethoxysilane in an amount from 0-10 percent;
b) trimethoxy($C_{2-6}$alkoxy)silane in an amount from 15-30 percent;
c) dimethoxydi($C_{2-6}$alkoxy)silane in an amount from 25-45 percent;
d) methoxytri($C_{2-6}$alkoxy)silane in an amount from 15-30 percent; and
e) tetra($C_{2-6}$alkoxy)silane in an amount from 0-10 percent, the total of components a), b), c), d) and e) equaling 100 weight percent.

11. A polymerization process for the polymerization of one or more olefin monomers comprising contacting said monomer or monomers under polymerization conditions with a polymerization catalyst composition according to any one of claims 1 and 2-10.

12. A process according to claim 11 which is a gas phase polymerization process.

13. A process according to claim 11 which is conducted in more than one reactor operating in series.

14. A process of claim 11 wherein propylene is polymerized to form polypropylene.

* * * * *